United States Patent Office 3,794,678
Patented Feb. 26, 1974

3,794,678
(1,4-CYCLOHEXADIEN-1-YL)ACETIC ACID
William Dvonch, Radnor, and Harvey E. Alburn, West Chester, Pa., assignors to American Home Products Corporation, New York, N.Y.
No Drawing. Filed July 22, 1969, Ser. No. 843,802
Int. Cl. C07c 61/16
U.S. Cl. 260—514 L  1 Claim

ABSTRACT OF THE DISCLOSURE

This invention concerns (1,4-cyclohexadien-1-yl) alkanoic acids which are useful as anti-inflammatory agents. Further, these compounds are also useful intermediates in the preparation of synthetic 6-(1,4-cyclohexadien-1-ylamido)penicillanic acids and 7-(1,4-cyclohexadien-1-ylamido)-cephalosporanic acids which have potent activity against penicillin resistant staphylococci.

The present invention relates to new and novel carboxylic acid intermediates. In particular, it is concerned with 1,4-cyclohexadien-1-ylalkanoic acids which in standard and accepted pharmacological tests have shown usefulness as anti-inflammatory agents. Further, these carboxylic acids have utility as intermediates in the preparation of synthetic 6-(1,4-cyclohexadien-1-ylamido)penicillanic acids and 7-(1,4-cyclohexadien-1-ylamido)cephalosporanic acids which in standard and accepted biological procedures have demonstrated activity against penicillin resistant staphylococci.

The new and novel 1,4-cyclohexadien-1-ylalkanoic acids of the present invention are exmplified by the following structural formula:

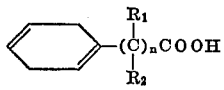

wherein $R_1$ and $R_2$ are both selected from the group consisting of hydrogen and lower alkyl and $n$ is an integer from 1 to 6. As employed herein the term "lower alkyl" is meant to include both branched and straight chain hydrocarbon sustituents containing from one to six carbon atoms. Typical examples of the compounds of this invention are:

2-(1,4-cyclohexadien-1-yl)acetic acid;
3-(1,4-cyclohexadien-1-yl)propionic acid;
2-(1,4-cyclohexadien-1-yl)butyric acid;
2-(1,4-cyclohexadien-1-yl)caproic acid;
2-(1,4-cyclohexadien-1-yl)-2-methylpropionic acid; and
4-(1,4-cyclohexadien-1-yl)butyric acid.

The new and novel compounds of the present invention may be prepared by the process which is illustrated by the following reaction sequence:

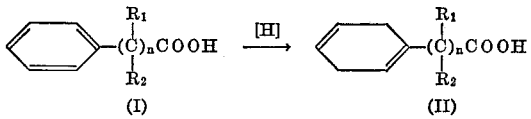

wherein $R_1$ and $R_2$ and $n$ are defined as above. The reduction reaction is effected by contacting an appropriate phenylalkanoic acid (I) with sodium in liquid ammonia, in the presence of an alkanol, e.g. methanol, at a temperature range of about minus —40 to about minus —50° C. for a period of about one to about two hours.

When the reduction is complete, the product (II) is recovered by standard procedures. For example, the reaction mixture is admixed with ammonium chloride, the solvent removed under vacuum and the residue recrystallized from a suitable solvent, e.g. water to afford an appropriate (1,4-cyclohexadien-1-yl)alkanoic acid (II).

The phenylalkanoic acid (I) starting materials employed in the above reaction are either commercially available or are readily prepared by chemical procedures well known in the art. The new novel (1,4-cyclohexadien-1-yl)alkanoic acids (II) of the present invention are valuable intermediates in the preparation of their corresponding 6-(1,4-cyclohexadien-1-ylamido)penicillanic acids and 7-(1,4-cyclohexadien-1-ylamido)cephalosporanic acids which possess valuable anti-bacterial properties. In particular, these penicillins and cephalosporins are active against penicillin resistant staphylococci. The 6-(1,4-cyclohexadien-1-ylamido)penicillanic acids are described and claimed in copending U.S. patent application, Ser. No. 643,739, entitled "6(1,4-Cyclohexadien-1-ylamido) Penicillanic Acids," now abandoned while the 7-(1,4-cyclohexadien-1-ylamido)cephalosporanic acids are described and claimed in copending United States patent application, Ser. No. 843,801, entitled "7-(1,4-Cyclohexadien-1-ylamido) Cephalosporanic Acids and Related Compounds," now abandoned. Both of these applications were filed in the United States Patent Office by the coinventors Harvey E. Alburn and William Dvonch on July 22, 1969. The above-described penicillins and cephalosporins are readily prepared from the (1,4-cyclohexadien-1-yl)alkanolic acid intermediates of the present invention by interaction with 6-amino-penicillanic acid and 7-aminocephalosporanic acid. These acylation reactions are hereinafter specifically illustrated in Examples V and VI.

The new and novel (1,4-cyclohexadien-1-yl)alkanoic acids (II) of the present invention possess valuable pharmacological activity. In particular, these compounds in standard pharmacological procedures demonstrate anti-inflammatory activity and are useful as anti-inflammatory agents.

In the pharmacological evaluation of the anti-inflammatory compounds of this invention the in vivo effects of the compounds of this invention are tested as essentially set forth by Winter et al. in the Federation Proceedings, March-April, 1963, vol. 22, No. 2, Part 1. The procedure employed is as follows:

Test animal: Rat, male, Wistar 150 ± 30 grams. Bilaterally adrenalectomized.
Route: Oral
Vehicle: CMC (0.5%) aqueous
Inflammatory agent: Cotton pellets, weight range of 38 ± 1
Procedure: Rats are anesthetized and two cotton pellets are inserted subcutaneously. Randomize animals. Room temperature maintained at 78-80° F. and animals provided with 1% saline containing 0.01% glucose, and standard stock diet. Beginning on same day administer treatment twice daily for five consecutive days (10 doses) and autopsy on seventh day. Remove granulomas (cotton pellets), dry for seventy-two hours at 80° C. and then maintain for twenty-four hours at room temperature. Pellets are weighed individually.
Endpoints: (1) Initial and (2) final body weight to the nearest gram; (3) weights of pooled thymus (wet), (4) net weight dry granulomas to nearest 0.1 mg.

Activity: (A) Percent inhibition = 100%

$$\times \frac{\text{Av. increase (mean) in pellet weights of treated groud}}{\text{Av. increase (mean) in pellet weights of control group}}$$

The (1,4-cyclohexadien-1-yl)alkanoic acids (II) of the present invention when tested by the above procedure afford about a twenty percent (20%) inhibition when administered at an oral dose of about 160 mg./kilo of animal body weight.

When the compounds of this invention are employed as anti-inflammatory agents they may be administered alone or in combination with pharmacologically acceptable carriers, the proportion of which is determined by the solubility and chemical nature of the compound, chosen route of administration and standard biological practice. For example, they may be administered orally in the form of tablets or capsules containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present anti-inflammatory agents will vary with the form of administration and the particular compound chosen. Furthermore, it will vary with the particular subject under treatment. Generally, treatment is initiated with small dosages substantially less then the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration:

EXAMPLE I

In a three liter, three necked flask fitted with a Dry-Ice condenser protected with a calcium chloride tube, gas inlet tube, thermometer, and a magnetic stirrer, there is placed phenylacetic acid (8.15 g., 0.06 mole) and methyl alcohol (250 ml.). The flask is placed in a Dry Ice-acetone bath and dry ammonia gas is passed in until two liters are collected. The temperature of the ammonia is maintained at $-40$ to $-50°$ C. while sodium metal (36 g., 1.60 mole) is added in portions over one and a half hours. The blue color is allowed to fade before each addition. Ammonium chloride (84 g., 1.60 mole) is then added with care, and the ammonia is allowed to evaporate. The residual ammonia and methyl alcohol are removed by evacuation with a water aspirator. The residue is treated with water (100 ml.); the mixture filtered; and the filtrate adjusted to pH 2.0 to precipitate the crude product which is reprecipitated from water to afford 2-(1,4-cyclohexadien-1-yl)acetic acid, M.P. 109–111° C.

*Analysis.*—Calc'd for $C_8H_{10}O_2$: C, 69.54; H, 7.30. Found: C, 69.49; H, 6.95.

When the above procedure is repeated substituting 3-phenylpropionic acid for phenylacetic acid, the product obtained is 3-(1,4-cyclohexadien-1-yl)propionic acid.

EXAMPLE II

In a three liter, three necked flask fitted with a Dry Ice condenser protected with a calcium chloride tube, gas inlet tube, thermometer, and a magnetic stirrer, there is placed 2-phenylbutyric acid (0.060 mole) and ethyl alcohol (250 ml.). The flask is placed in a Dry Ice-acetone bath and dry ammonia gas is passed in until two liters are collected. The temperature of the ammonia is maintained at $-40$ to $-50°$ while lithium metal (1.60 mole) is added in portions over one hour. The blue color is allowed to fade before each addition. Ammonium chloride (1.60 mole) is then added with care, and the ammonia allowed to evaporate. The residual ammonia and ethyl alcohol are removed by evacuation with a water aspirator. The residue is treated with water (100 ml.); the mixture filtered; and the filtrate adjusted to pH 2.0 to precipitate the crude product which is recrystallized from water to afford 2-(1,4-cyclohexadien-1-yl)butyric acid.

In a similar manner, 2-phenylcaproic acid is reduced to yield 2-(1,4-cyclohexadien-1-yl)caproic acid.

EXAMPLE III

In a six liter, three necked flask fitted with a Dry Ice condenser protected with a calcium chloride tube, gas inlet tube, thermometer, and a magnetic stirrer, there is place 2-methyl-2-phenylpropioncic acid (0.120 mole) and propyl alcohol (500 ml.). The flask is placed in a Dry Ice-acetone bath and dry ammonia gas is passed in until four liters are collected. The temperature of the ammonia is maintained at about $-50°$ C. while sodium metal (3.20 mole) is added in portions over two hours. The blue color is allowed to fade before each addition. Ammonium chloride (3.20 mole) is then added with care, and the ammonia allowed to evaporate. The residual ammonia and propyl alcohol are removed by evacuation with a water aspirator. The residue is treated with water (200 ml.); the mixture filtered; and the filtrate adjusted to pH 2.0 to precipitate the crude product which is recrystallized from water to afford 2-(1,4-cyclohexadien-1-yl)-2-methyl-propionic acid.

EXAMPLE IV

When the procedure of Examples I–III is repeated to reduce appropriate phenyl alkanoic acid, the following compounds are obtained:

4-(1,4-cyclohexadien-1-yl)butyric acid;
5-(1,4-cyclohexadien-1-yl)valeric acid;
6-(1,4-cyclohexadien-1-yl)caproic acid;
2-(1,4-cyclohexadien-1-yl)valeric acid;
2-ethyl-2-(1,4-cyclohexadien-1-yl)butyric acid;
2-butyl-3-(1,4-cyclohexadien-1-yl)caproic acid; and
5-(1,4-cyclohexadien-1-yl)-3,4-dimethylvaleric acid.

EXAMPLE V

Ethylchloroformate (1.47 ml., 0.015 mole) is added to an ice-cold solution of 2-(1,4-cyclohexadien-1-yl)acetic acid (2.08 g., 0.015 mole) and triethylamine (2.60 ml., 0.018 mole) in acetone (120 ml.). The solution is stirred at 0° C. for 10 minutes and then cooled to $-50°$ C with Dry Ice-acetone. The suspension is rapidly stirred while an ice-cold solution of 7-aminocephalosporanic acid (4.89 g., 0.018 mole) in 3% sodium bicarbonate solution (126 ml.) is added. The resulting solution is stirred at 0° C. for one-half hour, at 25° C. for one hour, and is then extracted with ether (3 × 120 ml.). The pH of the aqueous phase is lowered from 8.1 to 2.0 with 6 N hydrochloric acid, and the solution extracted with methyl isobutyl ketone (3 × 120 ml.). The organic phase is dried over sodium sulfate and concentrated in vacuo. The resulting oil is stored at 5° C. until it crystallizes to afford 7[2-(1,4-cyclohexadien-1-yl)acetamido]cephalosphoranic acid, 160–2° C. melting point.

*Analysis.*—Calc'd for $C_{18}H_{20}N_2O_6S$: C, 55.10; H, 5.14; N, 7.14; S, 8.08. Found: C, 55.41; H, 5.40; N, 6.96; S, 8.02

EXAMPLE VI

Ethylchloroformate (0.98 ml., 0.010 mole) is added to an ice-cold solution of 2-(1,4-cyclohexadien-1-yl)acetic acid (1.38 g., 0.010 mole) and triethylamine (1.70 ml., 0.012 mole) in acetone (80 ml.). The solution is stirred at 0° C. for 10 minutes and cooled to $-50°$ C. with Dry Ice-acetone. The suspension is rapidly stirred while an ice-cold solution of 6-aminopenicillanic acid (2.59 g., 0.012 mole) in 3% sodium bicarbonate solution (84 ml.) is added. The reaction is stirred at 0° C. for one-half hour, at 25° C. for another half hour and extracted with ether (3 × 80 ml.). The pH of the aqueous phase is dropped from 8.4 to 2.5 with hydrochloric acid, and the solution is extracted with methyl isobutyl ketone (3 × 60 ml.). An equal volume of water is added to the organic phase, and the pH of the aqueous phase is adjusted to 6.0 with solid sodium bicarbonate. The aqueous phase is separated, concentrated to remove the methyl isobutyl ketone, and freeze-dried to yield the sodium salt of 6-[2-(1,4-cyclohexadien-1-yl)acetamido]penicillanic acid.

What is claimed is:
1. 2-(1,4-cyclohexadien-1-yl)acetic acid.

References Cited
UNITED STATES PATENTS

| | | | |
|---|---|---|---|
| 3,658,925 | 4/1972 | Erman et al. | 260—665 |
| 3,625,984 | 12/1971 | Levine | 260—396 |

OTHER REFERENCES

Camps et al., Anal. Quim 64, p. 167 (1968), abstract only

Camps et al., Anal. Quim 64, p. 1089 (1968), abstract only.

LORRAINE A. WEINBERGER, Primary Examiner

R. GERSTL, Assistant Examiner

U.S. Cl. X.R.

260—239.1, 243 C, 515 R; 424—246, 271, 317